Dec. 18, 1956  J. R. PERILHOU ET AL  2,774,814
POST-DEFLECTION HORIZONTAL COLOR STRIPE PICK-UP TUBE
Filed April 15, 1952  2 Sheets-Sheet 1

INVENTORS
Jean Robert Perilhou
Johan Lodewijk Hendrik Jonker
BY *signature*
AGENT INVENTORS
Jean Robert Perilhou
Johan Lodewijk Hendrik Jonker
BY *Fred M Vogel*
AGENT

United States Patent Office 2,774,814
Patented Dec. 18, 1956

2,774,814
POST-DEFLECTION HORIZONTAL COLOR STRIPE PICK-UP TUBE

Jean Robert Perilhou and Johan Lodewijk Hendrik Jonker, Eindhoven, Netherlands, assignors to Hartford National Bank and Trust Company, Hartford, Conn., as trustee Application April 15, 1952, Serial No. 282,332

Claims priority, application Netherlands May 2, 1951

7 Claims. (Cl. 178—5.4)

This invention relates to colour-television cameras comprising a camera tube together with electrostatic and/or electromagnetic means for line- and frame-deflection of the electron beam produced in the tube. The invention furthermore relates to camera tubes suitable for use in such devices.

Television cameras commonly utilise camera tubes in the form of electron discharge tubes comprising an electrode system which includes a so-called target plate (or storage plate). The term "target plate" is to be understood to mean a plate-shaped electrode on which a distribution of charge occurs during operation which is a function of the intensity of a luminous image of the scene to be transmitted, which image is optically produced on a photo-sensitive electrode. Several forms of camera tube of this kind are known, the structural differences between the various forms being due chiefly to the arrangement of the photo-electrode with respect to the target plate. In the tubes which are termed iconoscopes the photo-cathode and the target plate are united whereas in the so-called image iconoscope there is a fairly large spacing between the photo-cathode and the target plate. In the latter form the electron current produced under the action of light thrown on the photo-cathode is directed with the aid of electrostatic and/or electromagnetic fields on to the target plate.

The invention is concerned with the form and use of camera tubes comprising an electrode system for producing an electron beam scanning the charge pattern on a target plate as above defined and thus producing across an output resistor an alternating voltage which is at each instant a function of the charge at the point struck by the electron beam and thus also of the number of photo-electrons producing the said charge, which in turn is a function of the intensity of the incident light. The photo-electrons may be released either from the target plate or from a separate cathode.

With known tubes of this kind the target or separate photo-cathode is struck by non-monochromatic light. The photo-electrode emits electrons to an amount dependent upon the total intensity of the incident light, it not being possible to distinguish between the emitted electrons according to the colour of light by which they have been released. Consequently, it is not possible without further expedients to transmit coloured images.

Efforts have been made to transmit colour images by the aid of a colour filter in the path of the light rays travelling towards the photo-electrode. Said light filters were constituted by strips, dots or other figures of different colour transmissions. The present invention relates to improved systems comprising a colour filter.

A colour-television camera according to the invention comprises a camera tube having a target plate and electrostatic and/or electromagnetic means for line and frame deflection of an electron beam for target-plate scanning which is produced and controlled within the tube by an electrode system comprising at least a cathode, an accelerating anode, a field electrode (as hereinafter defined) and a grid provided between the accelerating anode and the field electrode, and it is characterized in that (1) the grid is supplied with a voltage which is positive with respect to that of the cathode; (2) the grid has a negative charge; (3) the direction of each constituent part of the electron beam immediately before it is incident upon the grid intersects, at the position of incidence, the direction of the electrostatic lines of force between the grid and the field electrode; (4) the active surface of the grid comprises solely parallel wires; (5) each constituent part of the beam beyond the grid is concentrated by the electrostatic field between the grid and the field electrode in such manner that the width of a beam incident upon the target plate, measured at right angles to the direction of the grid wires and at the position of incidence, is at the most equal to half the width of the said beam at the position of the grid; (6) the grid is supplied with an alternating voltage by which, after the grid has been passed, a variable deflection of the beam traverse to the direction of the grid wires is obtained; (7) a colour filter is provided in the path of the light rays, inside or outside the tube, which filter is constituted by strips of n different colour absorptions of which the images on the target plate extend parallel with the direction of the grid wires and periodically recur in the same sequence, n different strips being associated with one aperture of the grid.

It is evident that the number of electrodes required for producing the electron beam may exceed those specified. Since the invention is independent of the manner in which the beam is produced, the simplest system for producing a beam is given in the description and claims, it being understood that other known means for producing a beam can be used.

It is necessary for the operation of the device according to the invention that an electrostatic field is produced beyond the grid (that is in the direction of travel of the electrons). It is for this purpose that a field electrode is required in the tube beyond the grid. As a rule, the minimum spacing between the grid and the accelerating anode will be larger than the minimum spacing between the grid and the field electrode. In certain cases, it is possible to make the front of the target plate fulfil the function of a field electrode. Consequently, in this case the target plate and the field electrode are united. In other cases the field electrode may have the shape of a grid and be provided between the target plate and the aforementioned deflection grid.

Embodiments of the invention will now be described with reference to the accompanying drawings.

In the drawing, Figs. 1, 2 and 3 are diagrams of electrodes to illustrate the principle underlying the invention.

Figure 7:
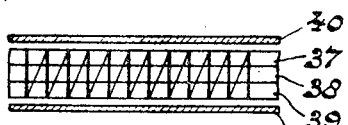

Fig. 7 serves to illustrate a method of scanning the target plate.

Figure 8:
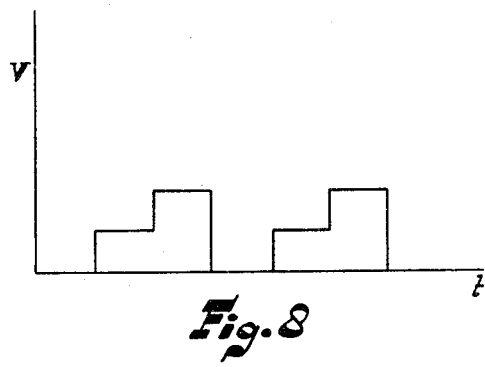

Fig. 8 shows a suitable curve of voltage to be supplied to the deflection grid.

Figure 9:
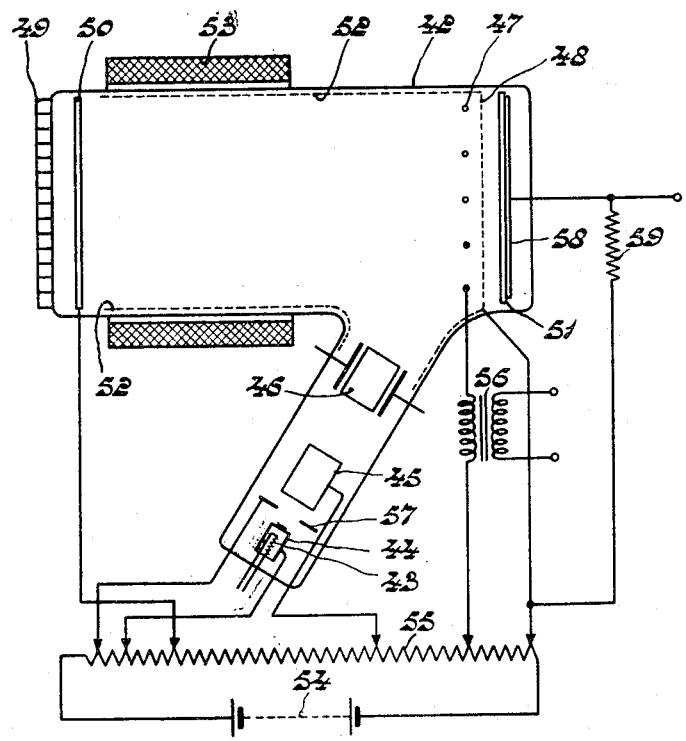

Fig. 9 shows one form of camera according to the invention and the tube used therein, together with part of the circuit-arrangement required.

Figure 1:
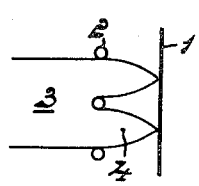

In Fig. 1, reference numeral 1 indicates a collector electrode which in this case is assumed to act as a field electrode, 2 indicating a grid which is arranged in front of the said electrode and the active surface of which comprises solely parallel wires at right angles to the plane of the drawing. If the grid 2 has a positive potential with respect to a source of electrons, and furthermore has a negative charge, a beam from that source as indicated at 3 is divided by the grid into a plurality of narrow convergent beams as indicated at 4. (A grid at a positive potential acquires a negative charge if it occupies a position in a potential field such that the potential supplied to the grid is lower than that which would prevail at this position in the absence of the grid.) Consequently, as viewed from the cathode of the source of electrons a series of focal points is present behind the grid, which points may be located before, on or after the electrode 1. It is evident that the width of the beam 3 travelling towards the grid, in the plane of the drawing, need not be greater than the width of the meshes of the grid. A concentrating action is also exerted upon a beam having the same width or a smaller width than the spacing between two grid wires.

In Fig. 1, the beam 3 strikes the grid 2 at right angles. However, an inclined beam will also be divided in a similar manner into narrow convergent beams, but in this case there is, in addition to the division and the convergence, another phenomenon which will be explained with reference to Fig. 2.

Figure 2:
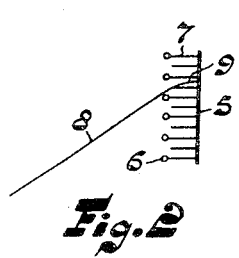

In Fig. 2, the reference numeral 5 indicates the collector (and field) electrode behind a grid designated 6. The electrostatic lines of force extend as at 7 between the grid 6 and the electrode 5. When the electron beam indicated at 8 is incident in an inclined direction, it follows, after passage of the grid, a curved path 9, which will have a smaller or greater curvature according as the field between the grid 6 and the electrode 5 is stronger or weaker.

Figure 3:
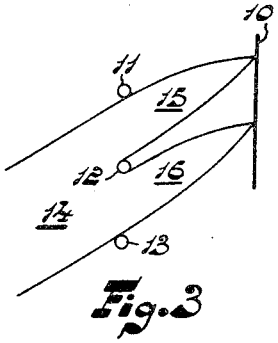

Fig. 3 shows the resultant of the actions explained in Figs. 1 and 2. In this figure, the reference numeral 10 indicates the collector (and field) electrode and 11, 12 and 13 are three grid wires. The beam travelling to the grid is designated 14; it is incident upon the surface of the grid in an inclined direction, thus intersecting the lines of force between the grid and the collector electrode. The electron beam is thus divided into two convergent deflected beams as indicated at 15 and 16. The focal points are here shown to be formed on the electrode 10. It is evident that this is not necessary, since the said electrode may alternatively be provided at a shorter or greater distance from the grid.

It may be mentioned that a beam which fills only part of a mesh of the grid is also concentrated at the same area of the collector electrode. Upon displacement or deflection of the beam 14 of Fig. 3 in a direction at right angles to the grid wires, the focal points invariably remain in positions which are determined only by the voltage between the grid and the collector electrode. When this voltage varies, the field gradient between the grid and the collector electrode varies, so that the beam acquires a different direction. The striking point on the anode will thus be shifted and this in the same direction for all beams.

Two cases are possible in which focal lines instead of focal points occur. In one case, a focal line is obtained because the cross-sectional dimension of the beam at right angles to the plane of the drawing has a size considerably larger than that in the plane of the drawing. The same effect is obtained if the cross-section of the beam has approximately the same size in any direction by causing the beam to be deflected parallel with the direction of the grid wires.

If the electrode 10 of Fig. 3 is replaced by a target plate (acting also as the field electrode) the charges produced on the said plate may be scanned. If the charges on the target plate are produced by photo-electrons released from a photo-cathode, in front of which there is a colour filter which is constituted by strips of different colour transmissions, the charges are dependent upon the intensity of the transmitted colour. Consequently, the charges are thus grouped on the target plate so-to-say in the manner of colour lines. In the following description we may consequently refer to a green line on the target plate when the charges are produced by light transmitted by a green strip of the filter. Similarly, we may talk of blue lines, red lines or lines of another colour.

Remembering the foregoing remarks concerning the determination of the areas at which a beam or part of a beam, at a determined voltage of the deflection grid, strikes the collector electrode, now also the target plate, it will be seen that steps may be taken to ensure that a beam invariably strikes lines of the same colour. Consequently, at a constant voltage between the grid and the target plate lines of the same colour are always struck. Other colour lines may be struck only by varying the voltage between the grid and the target plate.

The beam 14 may be so narrow as to fall between two grid wires. However, this is not required since, as explained above, it is ensured that a beam embracing more than one mesh of the grid strikes areas on the target plate which have a charge produced by the same colour. It is necessary, however, that the beam is concentrated at the position at which it strikes the target plate to such extent that its dimension, measured at right angles to the direction of the grid wires, is smaller than half its dimension at the position of the grid, otherwise there is not sufficient space for separating the different lines on the screen.

As has been explained above, it is necessary for each constituent part of the electron beam to strike the grid electrode in a direction such that it intersects the lines of force between grid and field electrode. With the arrangement so far considered the difficulty occurs that the angle of incidence is in general not the same throughout the grid, so that the deflection which is brought about by the grid and which is a function inter alia of the said angle is not the same throughout. As a rule, a shift of the striking point on the target plate is desired which is independent of the direction of the beam before the grid. Steps may be taken to ensure this.

Figure 4:
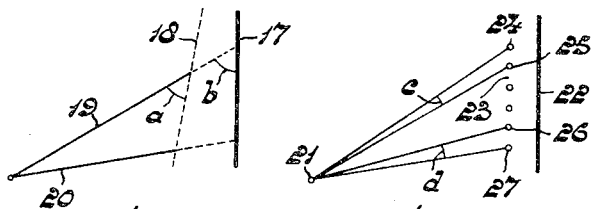
Figs. 4 and 5 show modifications of the electrodes shown in Figs. 1 and 2.

For this purpose, for example, the grid electrode and the field electrode may be given appropriate curvature. For plane electrodes there is also another solution which is shown in Fig. 4. In this figure, 17 is the field electrode and 18 the grid. The latter is arranged in such manner that the direction of each constituent part of the electron beam at the position immediately before the grid encloses with the surface of the grid an angle which is more acute than that enclosed with the plane of the field electrode. In Fig. 4, the beam constituent indicated at 19 encloses with the surface of the grid 18 an angle $a$ which is smaller than the angle $b$ enclosed by this beam constituent with the surface of the electrode 17. The angle of deflection at the upper end of the grid 18 is larger than that of a beam constituent 20, which is incident at the lower end of the grid 18. However, since the length of the path between the electrodes 18 and 17 is, at the upper end, smaller than that at the lower end, the shift of the striking point on the electrode 17 is substantially the same for the two areas.

A further disadvantage involved is that the angle enclosed between two lines passing through the centre of rotation of the electron beam and two adjacent grid wires is not the same for all areas of the grid when the spacing between pairs of adjacent grid wires is the same throughout. This is shown more clearly in Fig. 5. The centre of rotation of the electron beam is here indicated at 21, the field electrode at 22 and the grid 23. It is evident that the angle $c$ is smaller than the angle $d$. Consequently, the electron current passing between wires 24 and 25 of the grid is smaller than the current passing between wires 26 and 27. This difference may be obviated by making the spacing of the grid wires smaller according as the direction of the electron beam encloses a larger angle with the surface of the grid. It may then be ensured that the angles $c$ and $d$ are equal.

Figure 6:
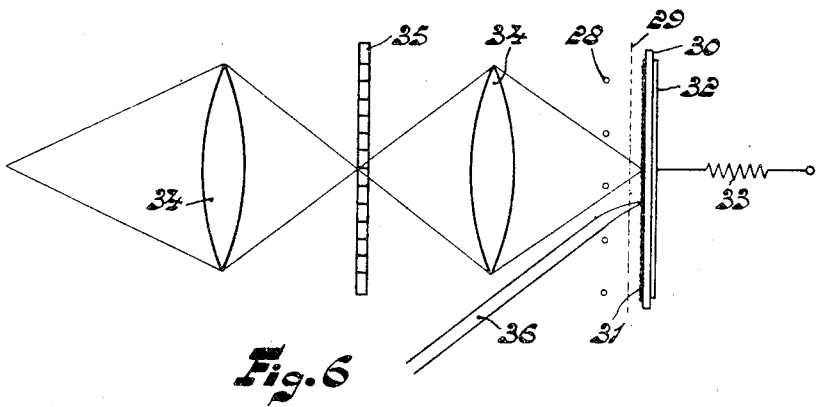
Fig. 6 shows diagrammatically the structure of the electrode system in a colour-television camera tube in which use is made of three main colours.

The constructions indicated above may naturally be used in combination,

Fig. 6 shows, in a much simplified form, part of a device according to the invention which permits of transmitting colour-television images. The plane of the drawing is a cross-sectional view at right angles to the direction of the wires of a grid 28. A field electrode designated 29 has a positive potential with respect to the grid 28. 30 is the insulating support for the target plate which is formed on the side facing the field electrode from a mosaic 31 of photosensitive elements. The other side of the support 30 is provided with a signal electrode 32, which is connected to an output resistor 33, across which voltage pulses occur which are transmitted after being amplified. The scene to be transmitted is thrown by way of an optical system 34 on to the photo-sensitive layer 31 by way of a filter 35. The latter is built up from strips, parallel to the wires of the grid 28, of different colour transmissions. An image subdivided into colour lines is thus produced on the target 31. The number of coloured strips in the filter 35 which is associated with each aperture between two grid wires is that chosen as necessary for composing the coloured image. As a rule, three different kinds of strips will be used, viz. red, green and blue, three filter strips then being associated with each aperture between two grid wires and transmitting red, green and blue light respectively. In Fig. 6, the number of filter strips for each slit of the grid is thus shown equal to 3. If the number of different light filters considered necessary is represented by $n$, then for Fig. 6 $n=3$. In the figure, 36 is an electron beam having a cross-sectional dimension smaller than the spacing between two grid wires, which beam strikes a determined line of the target plate by a suitable choice of the voltage between the electrodes 28 and 29. Since the sequence of the filter strips in the filter 35 is invariably the same and hence the distribution of the colour lines on the target 31 is also the same, the electron beam 36 invariably strikes a series of lines of the same colour at a constant voltage between the electrodes 28 and 29, say green. The electron ray strikes the red lines at another voltage between the said electrodes and the blue lines at still another voltage. However, the beam remains convergent at the different voltages. Consequently, it may be ensured that only one colour is effective at any one instant.

The manner of scanning the charge pattern on the target plate is similar to that of known storage tubes; the electrode 29 also fulfills the function of a collector for the secondary electrons released from the target plate 31. The electron beam 36 is deflected both in the direction of the wires of the grid 28 and in a direction at right angles thereto. However, differing from known devices, the voltage between the electrodes 28 and 29 is used to determine for any position of the electron beam 36 which of the three colour lines on the target plate which are associated with the slit of the grid passed by the beam is struck.

The direction of the line deflection may either coincide with the direction of the grid wires or make an angle therewith. It is preferably chosen to be at right angles to the direction of the grid wires.

We will first consider, with reference to Fig. 6, the operation when the direction of the line deflection is parallel to the grid wires 28. The connection between the variation in the voltage of the grid 28 and the direction of the beam immediately before the grid may then be chosen so that at first all green lines are scanned, so that a green image is transmitted, then all red lines and thereafter all blue lines. In the English and American literature this manner of scanning is termed "field sequential." However, as an alternative, the connection may be chosen such that all lines are scanned in succession. This is termed "line sequential" scanning. Continuous colour lines are obtained in either method of scanning. There is a third possibility which is termed "dot sequential." This method of scanning is obtained if the beam, instead of scanning one line continuously, flies from one line to another whereby points of different colours are struck in succession. This system is clarified in Fig. 7, which shows three colour lines 37, 38, 39 which are produced by green, red and blue light respectively. The beam may move over the said lines, for example, in accordance with the zigzag line shown, the inclined tracks being described so rapidly that the resultant voltage pulse is very small. The figure shows two grid wires 40 and 41. It is evident that it is not necessary for the beam to describe a zigzag line, it also being possible to obtain a similar action with the use of a sinusoidal line.

The afore-mentioned methods of scanning may alternatively be obtained when the direction of the line deflection is at right angles to the direction of the grid wires, as now to be explained.

In scanning according to the "field sequential" system, points of a green line located opposite the apertures of the grid are struck in succession when the beam describes one line. Consequently, instead of being continuous, said green line is composed of a plurality of dots. The beam flies back at the end of a line, starting the scanning of a new line. However, the voltage between the grid and the field electrode remains constant so that, as before, only green lines are struck and hence a new green dotted line is reproduced. The voltage between the grid and the field electrode does not vary until the whole image has been scanned and then, for example, solely red dotted lines are described. Consequently, three images in the three colours are described in succession.

Scanning according to the "line sequential" system is obtained when the voltage between the grid and the field electrode varies at the end of each line. Consequently, in this case, dotted lines of different colours are described in succession.

Scanning according to the "dot sequential" system is obtained when the voltage between the grid and the field electrode varies in such manner that a beam passing between two grid wires is directed successively towards the three colour lines. A line constituted by a series of dots of different colours is thus transmitted.

It is naturally also possible for several of the above-mentioned methods of scanning to be used in combination.

The voltage on the deflection grid preferably varies discontinuously as well as cyclically, for example, as shown in Fig. 8, in which the time and the voltage between the grid and the field electrode are plotted as abscissae and ordinates respectively. The voltage on the grid in this case decreases to zero at given moments; this is not necessary, however, and in most cases a constant voltage level which differs from zero will be used as the lower limit. The time intervals for the cyclically repeated levels may be equal to or smaller than the time for an image line or equal to the frame time.

Fig. 9 shows diagrammatically part of a camera according to the invention, including some important parts of the circuit. The camera tube has an envelope 42, which contains inter alia an electrode system for producing an electron beam, this electrode system being constituted by a cathode 44, heated by a filament, 43, an accelerating anode 45 and an intensity-control electrode 57. Furthermore, the tube contains a number of deflection plates 46 which permit deflection of the beam in two perpendicular directions. 47 is the deflection grid behind which a field electrode 48 is provided. The active surface of the grid 47 is constituted by parallel wires which are at right angles to the plane of the drawing. Provided on the front of the tube is a colour filter 49, by which a colour image subdivided into lines is thrown on to a photo-cathode 50. The electrons emitted by the photo-cathode are led to a target plate 51. This is effected by the co-operation of the electrostatic field between photo-cathode 50 and an electrode 52, connected to the field electrode 48, with an electromagnetic field produced with the use of a coil 53. Some rotation of the image from the vertical position thus takes place and to offset this the strips of the light filter are arranged at an angle to the direction of the grid wires such that the colour lines on the target plate are parallel to the grid wires. The image-producing part of the camera tube shown is, as may be seen, identical with that of the image iconoscope.

54 is a direct-voltage source which is shunted by a potentiometer resistance 55 from which the steady voltages for the various electrodes are derived. A transformer 56 supplies variable voltages to the deflection grid. A resistor 59, which is connected to a signal plate 58, exhibits during scanning of target plate 51 by the electron beam, voltage pulses which occur due to the "levelling" of the charge pattern on the target plate 51.

The invention is also applicable to camera tubes other than those shown, for example, the orthicon, the image orthicon or the vidicon.

Figure 5:
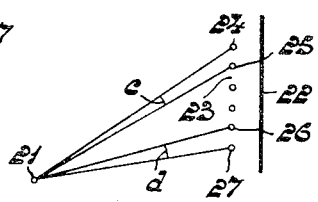

A possibility which has not yet been referred to in the foregoing description is the use of a device according to the invention for stereoscopic images, it being possible to utilise either filters in two complementary colours or polarisation filters which replace the colour filters shown in Figs. 4 and 5.

What we claim is:

1. A color television camera device comprising a color filter constituted by a plurality of parallel strips having $n$-different color absorption properties and periodically occurring in a given sequence, a photo-cathode sensitive to light-rays passing through said filter, a target plate receiving an image of said color strips from said photo-cathode, means to apply a given potential to said target plate, an electron gun including a cathode for producing an electron beam to impinge on the image on said target plate, means to apply a potential to said cathode which is less than said given potential, a grid comprising parallel wires mounted parallel to said strips and between said target plate and said electron gun, $n$ strips of said filter being associated with each aperture defined by two adjacent wires of said grid, means to apply a potential intermediate the potential of said cathode and said target plate to said grid whereby a potential gradient and electrostatic lines of force are produced between said grid and said target plate, said grid potential having a value lower than that which would prevail at its position in its absence, deflection means interposed between said grid and said electron gun for scanning said target plate whereby the electron beam is caused to intercept the direction of the lines of force at an angle at which the beam is deflected and concentrated in the direction of the target plate and at which the width of the beam measured at right angles to the direction of the grid wires at the area at which the beam strikes the target plate is not more than one-half the width of the beam at the area of the grid, and means to apply an alternating voltage to said grid to change the potential gradient existing between said grid and said target plate and to thereby change the image on said target plate struck by said beam.

2. A color television camera device comprising a color filter constituted by a plurality of parallel strips having $n$-different color absorption properties and periodically occurring in a given sequence, a photo-cathode sensitive to light rays passing through said filter, a target plate, a field electrode interposed between said photo-cathode and said target plate, means to apply a given potential to said field electrode, electron-optical means interposed between said photo-cathode and said target plate to cause the electrons being emitted from a given area of said photo-cathode to impinge upon a corresponding area of said target plate to produce thereon an image of said color strips, an electron gun including a cathode for producing an electron beam to impinge on the image on said target plate, means to apply a potential to said cathode which is less than said given potential, a grid comprising parallel wires mounted parallel to said strips and between said field electrode and said photo-cathode and between said field electrode and said electron gun, $n$-strips of said filter being associated with each aperture defined by two adjacent wires of said grid, means to apply a potential intermediate the potential of said cathode and said field electrode to said grid whereby a potential gradient and electrostatic lines of force are produced between said grid and said field electrode, said grid potential having a value lower than that which would prevail at its position in its absence, deflection means interposed between said grid and said electron gun for scanning said target plate whereby the electron beam is caused to intercept the direction of the lines of force at an angle at which the beam is deflected and concentrated in the direction of the target plate and at which the width of the beam measured at right angles to the direction of the grid wires at the area at which the beam strikes the target plate is not more than one-half of the width of the beam at the area of the grid, and means to apply an alternating voltage to said grid to change the potential gradient existing between said grid and said field electrode and to thereby change the image on said target plate struck by said beam.

3. A color television camera device comprising a color filter constituted by a plurality of parallel strips having $n$-different color absorption properties and periodically occurring in a given sequence, a photo-cathode sensitive to light rays passing through said filter, a target plate integral with said photo-cathode and receiving an image of said color strips, a field electrode disposed between said filter and said target plate, means to apply a given potential to said field electrode, an electron gun including a cathode for producing an electron beam to impinge on the image on said target plate, means to apply a potential to said cathode which is less than said given potential, a grid comprising parallel wires mounted parallel to said strips and between said field electrode and said electron gun, $n$-strips of said filter being associated with each aperture defined by two adjacent wires of said grid, means to apply a potential intermediate the potential of said cathode and said field electrode to said grid whereby a potential gradient and electrostatic lines of force are produced between said grid and said field electrode, said grid potential having a value lower than that which would prevail at its position in its absence, deflection means interposed between said grid and said electron gun for scanning said target plate whereby the electron beam is caused to intercept the direction of the lines of force at an angle at which the beam is deflected and concentrated in the direction of the target plate and at which the width of the beam measured at right angles to the direction of the grid wires at the area at which the beam strikes the target plate is not more than one-half of the width of the beam at the area of the grid, and means to apply an alternating voltage to said grid to change the potential gradient existing between said grid and said field electrode and to thereby change the image on said target plate struck by said beam.

4. A color television camera device comprising a color filter constituted by a plurality of parallel strips having $n$-different color absorption properties and periodically occurring in a given sequence, a photo-cathode sensitive to light rays passing through said filter, a target plate receiving an image of said color strips from said photo-cathode, a field electrode disposed between said filter and said target plate, means to apply a given potential to said field electrode, an electron gun including a cathode for producing an electron beam to impinge on the image in said target plate, means to apply a potential to said cathode which is less than said given potential, a grid comprising parallel wires mounted parallel to said strips and between said field electrode and said electron gun, the plane of said grid forming a small angle relative to the plane of said field electrode, n-strips of said filter being associated with each aperture defined by two adjacent wires of said grid, means to apply a potential intermediate the potential of said cathode and said field electrode to said grid whereby a potential gradient and electrostatic lines of force are produced between said grid and said field electrode, said grid potential having a value lower than that which would prevail at its position in its absence, deflection means interposed between said grid and said electron gun for scanning said target plate whereby the electron beam is caused to intercept the direction of the lines of force at an angle at which the beam is deflected and concentrated in the direction of the target plate and at which the width of the beam measured at right angles to the direction of the grid wires at the area at which the beam strikes the target plate is not more than one-half of the width of the beam at the area of the grid, and means to apply an alternating voltage to said grid to change the potential gradient existing between the said grid and said field electrode and to thereby change the image on said target plate struck by said beam.

5. A color television camera device comprising a color filter constituted by a plurality of parallel strips having n-different color absorption properties and periodically occurring in a given sequence, a photo-cathode sensitive to light rays passing through said filter, a target plate receiving an image of said color strips from said photo-cathode, a field electrode disposed between said filter and said target plate, means to apply a given potential to said field electrode, an electron gun including a cathode for producing an electron beam to impinge on the image on said target plate, means to apply a potential to said cathode which is less than said given potential, a grid comprising parallel wires mounted parallel to said strips and between said field electrode and said electron gun, n-strips of said filter being associated with each aperture defined by two adjacent wires of said grid, means to apply a potential intermediate the potential of said cathode and said field electrode to said grid whereby a potential gradient and electrostatic lines of force are produced exists between said grid and said field electrode, said grid potential having a value lower than that which would prevail at its position in its absence, deflection means interposed between said grid and said electron gun for scanning said target plate whereby the electron beam is caused to intercept the direction of the lines of force at an angle at which the beam is deflected and concentrated in the direction of the target plate and at which the width of the beam measured at right angles to the direction of the grid wires at the area at which the beam strikes the target plate is not more than one-half of the width of the beam at the area of the grid, and means to apply an alternating voltage to said grid to change the potential gradient existing between said grid and said field electrode and to thereby change the image on said target plate struck by said beam, said grid having an arcuate shape at which the shift of the point at which the beam strikes said target plate due to the alternating voltage applied to said grid is substantially the same throughout the surface of said target plate.

6. A color television camera device comprising a color filter constituted by a plurality of parallel strips having n-different color absorption properties and periodically occurring in a given sequence, a photo-cathode sensitive to light-rays passing through said filter, a target plate, means to apply a given potential to said target plate, electron-optical means interposed between said photo-cathode and said target plate to cause the electrons being emitted from a given area of said photo-cathode to impinge upon a corresponding area on said target plate to produce an image thereon of the color strips, an electron gun including a cathode for producing an electron beam to impinge on the image on said target plate, means to apply a potential to said cathode which is less than said given potential, a grid comprising parallel wires mounted parallel to said strips and between said target plate and said photo-cathode and between said target plate and said electron gun, n-strips of said filter being associated with each aperture defined by two adjacent wires of said grid, the spacing between adjacent wires of said grid closer to said cathode being smaller than the spacing between adjacent wires more remote from said cathode, means to apply a potential intermediate the potential of said cathode and said target plate to said grid whereby a potential gradient and electrostatic lines of force are produced between said grid and said target plate, said grid potential having a value lower than that which would prevail at its position in its absence, deflection means interposed between said grid and said electron gun for scanning said target plate whereby the electron beam is caused to intercept the direction of the lines of force at an angle at which the beam is deflected and concentrated in the direction of the target plate and at which the width of the beam measured at right angles to the direction of the grid wires at the area at which the beam strikes the target plate is not more than one-half of the width of the beam at the area of the grid, and means to apply an alternating voltage to said grid to change the potential gradient existing between said grid and said target plate and to thereby change the image on said target plate struck by said beam.

7. A color television camera device as claimed in claim 2 in which the alternating voltage applied to the grid has a plurality of different values for equal time intervals which are cyclically repeated.

References Cited in the file of this patent
UNITED STATES PATENTS

| | | |
|---|---|---|
| Re. 23,672 | Okolicsanyi | June 23, 1953 |
| 2,144,085 | Rothe et al. | Jan. 17, 1939 |
| 2,296,908 | Crosby | Sept. 29, 1942 |
| 2,446,791 | Schroeder | Aug. 10, 1948 |
| 2,452,293 | De Forest | Oct. 26, 1948 |
| 2,577,038 | Rose | Dec. 4, 1951 |
| 2,606,303 | Bramely | Aug. 5, 1952 |
| 2,622,226 | Theile | Dec. 16, 1952 |
| 2,650,264 | Weimer | Aug. 25, 1953 |

FOREIGN PATENTS

| | | |
|---|---|---|
| 736,575 | Germany | May 13, 1943 |